(12) United States Patent
Tartagni

(10) Patent No.: US 6,362,633 B1
(45) Date of Patent: Mar. 26, 2002

(54) CAPACITIVE DISTANCE SENSOR

(75) Inventor: Marco Tartagni, Meldola (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/179,923

(22) Filed: Oct. 27, 1998

Related U.S. Application Data

(63) Continuation of application No. 08/799,548, filed on Feb. 13, 1997, now abandoned.

(30) Foreign Application Priority Data

Feb. 14, 1996 (EP) .............................................. 96830068

(51) Int. Cl.[7] .............................................. G01R 27/26
(52) U.S. Cl. ...................... 324/662; 324/661; 324/671; 341/33
(58) Field of Search ................................ 324/661, 662, 324/663, 678, 686, 691, 687; 382/124, 125, 126, 127; 361/179, 181; 341/33

(56) References Cited

U.S. PATENT DOCUMENTS

| 3,493,855 A | 2/1970 | Norwich | 324/664 |
| 3,641,431 A | 2/1972 | Pigage et al. | 324/662 |
| 3,781,855 A | 12/1973 | Killen | 382/126 |
| 3,873,927 A | 3/1975 | Overall | 324/667 |
| 3,967,310 A | 6/1976 | Horiuchi et al. | 257/637 |
| 4,016,490 A | 4/1977 | Weckenmann et al. | 324/671 |
| 4,096,758 A | 6/1978 | Moore | 73/718 |
| 4,161,743 A | 7/1979 | Yonezawa et al. | 257/636 |
| 4,183,060 A | 1/1980 | Barnette et al. | 324/662 |

(List continued on next page.)

FOREIGN PATENT DOCUMENTS

| EP | 0 226 082 | 6/1987 |
| EP | 0 397 244 A2 | 11/1990 |
| EP | 0 397 244 A3 | 11/1990 |
| EP | 0 397 244 B1 | 11/1990 |
| EP | 0 454 883 B1 | 6/1991 |
| EP | 0 455 070 B1 | 6/1991 |
| EP | 0 710 593 A1 | 5/1996 |
| EP | 0 779 497 A3 | 6/1997 |

(List continued on next page.)

OTHER PUBLICATIONS

Young et al., "Novel Fingerprint Scanning Arrays Using Polysilicon TFT's on Glass and Polymer Substrates," *IEEE Electron Device Letters*, 8(1):19–20, 1997, (Month Unavailable).

Tartagni et al., "A 390dpi Live Fingerprint Imager Based on Feedback Capacitive Sensing Scheme," IEEE International Solid–State Circuits Conference, Feb. 7, 1997, 5 pp.

Sarma and Barranger, "Capacitance–Type Blade–Tip Clearance Measurement System Using a Dual Amplifier with Ramp/DC Inputs and Integration," *IEEE* 41(5):674–678, Oct. 1992.

Woffenbuttel and Regtien, "Integrated Tactile Imager With an Intrinsic Contour Detection Option," *Sensors and Actuators* 16:141–153, 1989 (Month Unavailable).

*Primary Examiner*—Safet Metjahic
*Assistant Examiner*—Vincent Q. Nguyen
(74) *Attorney, Agent, or Firm*—Lisa K. Horgenson; David V. Carlson; SEED IP Law Group PLLC

(57) ABSTRACT

The distance sensor has a capacitive element (33, 34) in turn having a first plate (23) which is positioned facing a second plate (18) whose distance is to be measured. In the case of fingerprinting, the second plate is defined directly by the skin surface of the finger being printed. The sensor includes an inverting amplifier (13), between the input and output of which the capacitive element (33, 34) is connected to form a negative feedback branch. By supplying an electric charge step to the input of the inverting amplifier, a voltage step directly proportional to the distance being measured is obtained at the output.

31 Claims, 1 Drawing Sheet

U.S. PATENT DOCUMENTS

| | | | |
|---|---|---|---|
| 4,353,056 A | 10/1982 | Tsikos | 382/124 |
| 4,394,773 A | 7/1983 | Ruell | 382/124 |
| 4,428,670 A | 1/1984 | Ruell et al. | 356/71 |
| 4,429,413 A | 1/1984 | Edwards | 382/124 |
| 4,513,298 A | 4/1985 | Scheu | 347/64 |
| 4,571,543 A | 2/1986 | Raymond et al. | 324/425 |
| 4,577,345 A | 3/1986 | Abramov | 382/124 |
| 4,626,774 A | 12/1986 | Regtien | 324/683 |
| 4,656,871 A | 4/1987 | Czarnocki | 73/724 |
| 4,763,063 A | 8/1988 | Shkedi | 324/661 |
| 4,814,691 A | 3/1989 | Garbini et al. | 324/661 |
| 4,935,207 A | 6/1990 | Stanbro et al. | 422/68.1 |
| 4,958,129 A | 9/1990 | Poduje et al. | 324/661 |
| 5,028,876 A | 7/1991 | Cadwell | 324/678 |
| 5,325,442 A | 6/1994 | Knapp | 382/124 |
| 5,373,181 A | 12/1994 | Scheiter et al. | 257/415 |
| 5,430,381 A | 7/1995 | Dower | 324/452 |
| 5,467,022 A | 11/1995 | Aoki et al. | 324/661 |
| 5,530,581 A | 6/1996 | Cogan | 359/265 |
| 5,659,626 A | 8/1997 | Ort et al. | 382/125 |
| 5,778,089 A | 7/1998 | Borza | 382/124 |
| 5,828,773 A | 10/1998 | Setlak et al. | 382/126 |
| 5,844,415 A | 12/1998 | Gershenfeld et al. | 324/663 |
| 5,852,670 A | 12/1998 | Setlak et al. | 382/126 |
| 5,862,248 A | 1/1999 | Salatino et al. | 382/124 |
| 5,869,791 A | 2/1999 | Young | 178/20.01 |
| 5,903,225 A | 5/1999 | Schmitt et al. | 340/825.31 |
| 5,920,640 A | 7/1999 | Salatino et al. | 382/124 |
| 5,963,412 A | 8/1999 | Gershenfeld et al. | 324/663 |
| 5,973,623 A | 10/1999 | Gupta et al. | 341/33 |
| 6,011,859 A | 1/2000 | Kalnitsky et al. | 382/124 |
| 6,025,726 A | 2/2000 | Gershenfeld et al. | 324/671 |
| 6,051,981 A | 4/2000 | Gershenfeld | 324/663 |
| 6,066,954 A | 5/2000 | Gershenfeld et al. | 324/671 |
| 6,114,862 A | 9/2000 | Tartagni et al. | 324/662 |

FOREIGN PATENT DOCUMENTS

| | | |
|---|---|---|
| EP | 0 779 497 A2 | 6/1997 |
| EP | 0 786 745 A2 | 7/1997 |
| EP | 0 786 745 A3 | 7/1997 |
| EP | 0 790 479 A1 | 8/1997 |
| EP | 0 791 899 A3 | 8/1997 |
| EP | 0 791 899 A2 | 8/1997 |
| GB | 2279756 A | 1/1995 |
| GB | 2279757 A | 1/1995 |
| GB | 2312514 A | 10/1997 |
| WO | WO 97/40744 | 11/1997 |
| WO | WO 98/49691 | 11/1998 |
| WO | WO 99/28701 | 6/1999 |

CAPACITIVE DISTANCE SENSOR

CROSS REFERENCE TO RELATED APPLICATION

This application is a continuation of pending U.S. patent application Ser. No. 08/799,548 now abandoned, filed Feb. 13, 1997, which claims priority from European Patent Application No. 96830068.1, filed Feb. 14, 1996.

TECHNICAL FIELD

The present invention relates to a capacitive distance sensor, in particular, a small-distance (micrometric to millimetric) sensor.

Small-distance sensors are used, among other things, as pressure, proximity, roughness, mechanical stress and acceleration sensors, for example, in integrated microphony and for acquiring fingerprints.

For fingerprint acquisition in particular (to which reference is made herein purely by way of example of a preferred application of the present invention), known sensors include various types, for example: optical, piezoelectric, variable-conductance, thermal, ultrasonic and capacitive, the most promising of which in terms of precision, size, production and cost are capacitive sensors.

Capacitive sensors are based on the principle that the capacitance between two plates is inversely proportional to the distance between them, so that, using the contacting dermal tissue itself as the second plate of the sensor capacitor, and by determining the capacitance, it is possible to locate the ridges and grooves of the fingerprint. This is the principle used in U.S. Pat. No. 5,325,442 to Knapp, which relates to a sensor comprising an array of elementary cells, each comprising a sensitive electrode and an electronic switching device. The electrode is coated with dielectric material, such as passivation oxide or a polymer compound, onto which the epidermis is placed. When a cell is selected, a predetermined variation in potential is applied to the electrode to induce at the terminals an appropriate variation in charge. The extent of variation in charge depends on the capacitance associated with the electrode and is read by amplifying elements connected to the output of the device. To improve efficiency, the above patent suggests a surface grid connected to a reference potential to appropriately bias the skin tissue.

In the above known capacitive sensor, the capacitance between the plates of a capacitor varies in inverse proportion to the distance between the plates, which therefore poses the problem of normalizing the resulting data. In particular, if the capacitance being measured is very small, as in the application in question, serious difficulty is encountered in detecting the charge and discriminating between the various intermediate charge levels corresponding to different grey levels of the image to be generated in the presence of a low signal/noise ratio.

SUMMARY OF THE INVENTION

It is an object of the present invention to provide a sensor designed to overcome the drawbacks typically associated with known technology.

A preferred embodiment of the present invention is directed to a capacitive distance sensor for measuring small distances. The distance sensor includes a capacitive element having a first plate positioned facing a second plate. The first and second plates define a distance to be measured. The distance sensor also includes an amplifying means defining an input and an output. The capacitive element is connected between the input and the output to form a negative feedback branch.

In practice, according to the present invention, the detecting capacitor, the distance between the plates of which is to be determined, is placed in a negative feedback loop, thus inverting between the denominator and the numerator the dependance of the output voltage on the distance between the plates.

DETAILED DESCRIPTION OF THE INVENTION

Figure 1:
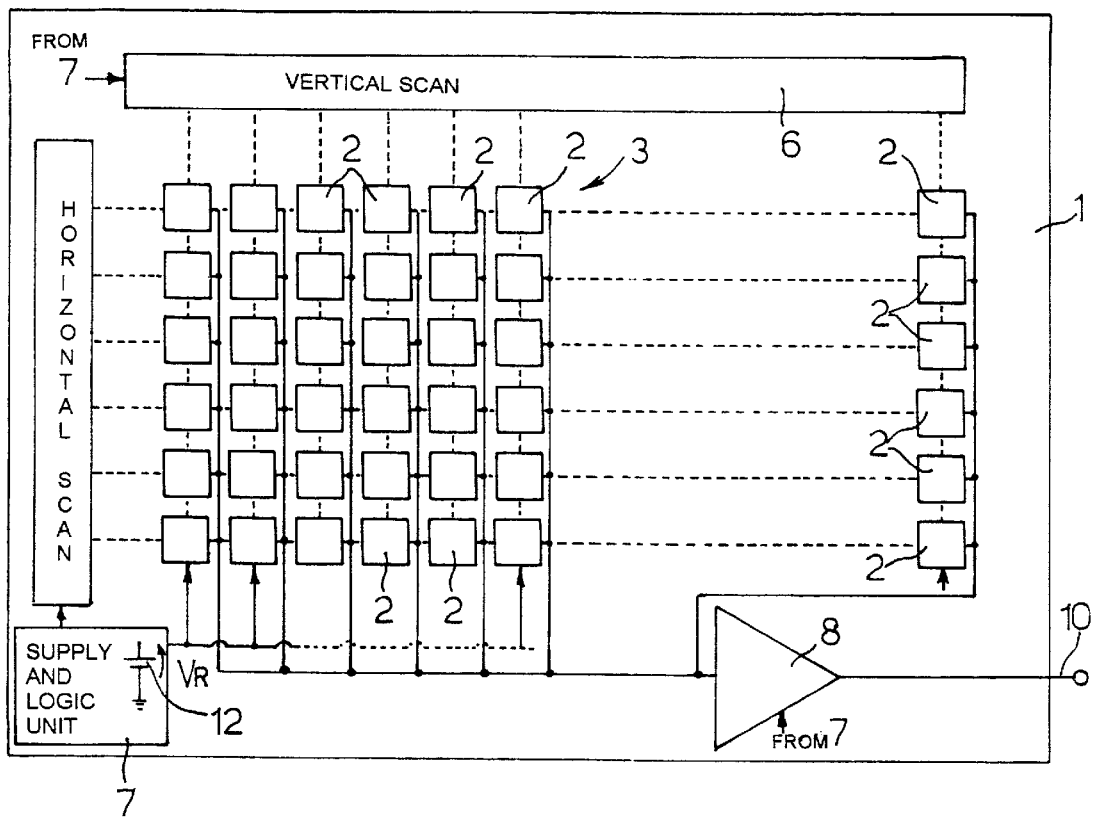
FIG. 1 shows a sensor device for acquiring fingerprints.

FIG. 1 shows a sensor device 1, preferably embodied in an integrated chip, comprising a number of cells 2 arranged to form an array 3 and each constituting an elementary sensor.

Device 1 also comprises a horizontal scanning stage 5 and a vertical scanning stage 6 for enabling one cell 2 at a time according to a predetermined scanning pattern. Preferably, to read the cells, stages 5, 6 enable the outputs of the cells sequentially, and comprise shift registers or decoders.

Device 1 also comprises a supply and logic stage 7, which supplies the components of the device (including cells 2), feeds the necessary reference voltages, and controls the sequence of steps provided for (as explained in detail below). In particular, FIG. 1 shows a voltage source 12 for generating a reference voltage variation $\Delta V_R$. A buffer 8 is connected to the outputs of all the cells 2, and supplies, at output 10 of the device, the signal present at the output of the cell 2 enabled by scanning stages 5, 6.

Figure 2:
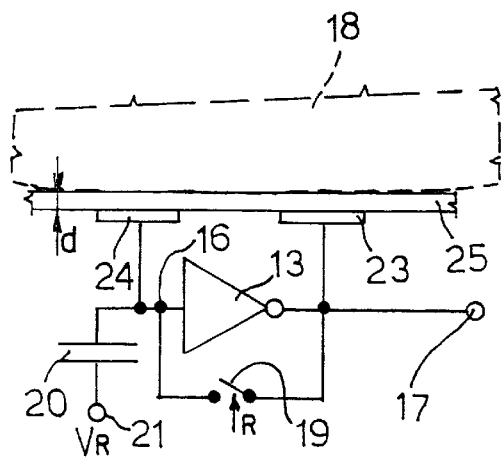
FIG. 2 shows a detail of a cell of the FIG. 1 device.

As shown in FIG. 2, each cell 2 comprises a low-power inverting amplifier 13 of gain A, in turn presenting an input 16 at input voltage $V_i$, and an output 17 at output voltage $V_o$ defining the output of cell 2. Each cell 2 also includes two plates 23, 24 of equal area positioned facing the skin surface 18 of the finger being printed. A reset switch 19 is connected between the input 16 and output 17 of inverting amplifier 13 and an input capacitor 20 is connected between input 21 of cell 2 and input 16 of inverting amplifier 13.

More specifically, plates 23 and 24 are respectively connected to output 17 and input 16 of inverting amplifier 13 and are covered with a dielectric layer 25 covering the face of integrated device 1 at array 3 of cells 2. In use, therefore, skin surface 18 forms a second plate facing plates 23, 24, and defining with them a pair of series capacitors feedback connected between input 16 and output 17 of inverting amplifier 13, so that a contact grid is not required to bias the skin surface at constant voltage.

Switch 19 is a controlled switch formed using any known technology (e.g., a MOS switch) and receives a control signal R from supply and logic stage 7. Input 21 of the cell is also connected to supply and logic stage 7 to receive a voltage signal $\Delta V_R$ as explained below.

To acquire fingerprints, skin surface 18 is placed on the surface of integrated device 1, at array 3, to complete the pairs of capacitors forming the feedback loops of amplifiers 13 of all the cells. At the start of the measurement, switches 19 of all the cells are closed, and the voltage level at inputs 21 is constant, so that the input voltage $V_i$ of all the cells 2 is brought to the same potential $V_o$ as the output, between the supply and ground at a high-gain point of inverting amplifier 13.

Subsequently, supply and logic stage 7 opens all the switches 19 in parallel, and supplies all the inputs 21 with a voltage step $\Delta V_R$, so that a charge variation $\Delta Q = C_i^* \Delta V_R$ (where $C_i$ is the capacitance of input capacitor 20) is induced at the terminals of each input capacitor 20 to permit a reading, as explained below, of the local distance "d" between plates 23, 24 and skin surface 18 facing them. Obviously, local distance "d" varies according to whether the point being measured corresponds to a groove, a ridge or a point between the two.

Scanning stages 5, 6 then sequentially enable the reading of cells 2, so that the voltage signal at output 10 of buffer 8 is supplied to a system for representing the distance, in known manner, by means of grey levels, and so providing a three-dimensional display of the skin surface.

The way in which local distance "d" between plates 23, 24 of each cell 2 and the plate formed by skin surface 18 is detected will now be described with reference to the equivalent electric diagram in FIG. 3.

Figure 3:
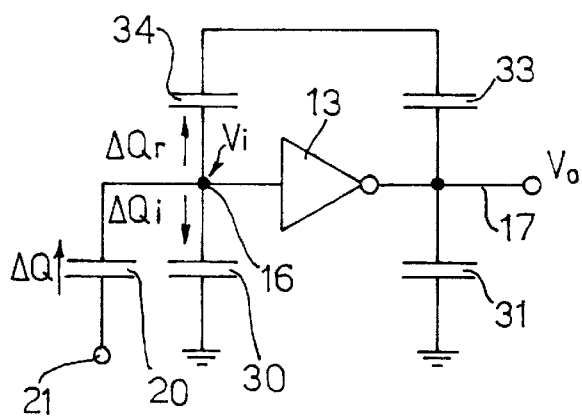
FIG. 3 shows an electric equivalent of the FIG. 2 cell.

FIG. 3 shows the equivalent input capacitance 30 and output capacitance 31 of inverting amplifier 13; the charge flow direction (indicated by the arrows) corresponding to the voltage variations at the plates; and the capacitors 33, 34 formed by plates 23, 24 and skin surface 18.

Assuming $C_I$ is the equivalent input capacitance of inverting amplifier 13 (capacitance of capacitor 30); $C_r$ is the total capacitance of series capacitors 33 and 34; A is the gain of inverting amplifier 13; $\Delta Q$ is the charge variation induced in capacitor 30 by voltage step $\Delta V_R$; $\Delta Q_i$ is the charge variation stored in equivalent input capacitance 30 as a result of step $\Delta V_R$; $\Delta Q_r$ is the charge variation in the feedback branch formed by the series connection of capacitors 33, 34; $\Delta V_i$ is the voltage step at input 16 of inverting amplifier 13; $\Delta V_o$ is the corresponding voltage variation at output 17 (equal to $-A\Delta V_i$); S is the size of the surface of each plate 23, 24 of capacitors 33, 34; $\epsilon_o$ is the electric constant (seeing as, in the fingerprinting application, the average distance between the skin and insulating layer 25—typically 60 $\mu$m at the grooves—is greater than the thickness of layer 25—typically 2 $\mu$m); and "d" is the local distance between plates 23, 24 and skin surface 18 (approximately the same for both plates 23, 24, in view of the very small size of cells 2—typically about 45 $\mu$m); then total feedback capacitance $C_r$ is given by the following equation:

$$C_r = \frac{S\varepsilon_o}{2d} \quad (1)$$

Moreover:

$$\Delta Q = \Delta Q_i + \Delta Q_r = C_I \Delta V_i + C_r(\Delta V_i - \Delta V_o) = -\frac{\Delta V_o}{A}(C_1 + C_r) - \Delta V_o C_r$$

so that:

$$\Delta V_o = -\frac{\Delta Q}{\frac{C_1}{A} + \left(1 + \frac{1}{A}\right)C_r} \quad (2)$$

Substituting (1) in (2) gives:

$$\Delta V_o = -\frac{\Delta Q}{\frac{C_1}{A} + \left(1 + \frac{1}{A}\right)\frac{S\varepsilon_o}{2d}} = -\frac{2\Delta Q d}{\frac{2C_1 d}{A} + \left(1 + \frac{1}{A}\right)S\varepsilon_o} \quad (3)$$

Assuming A>>1, (3) becomes:

$$\Delta V_o = d\frac{2\Delta Q}{S\varepsilon_o} \quad (4)$$

Consequently, by virtue of the negative feedback effected by capacitive coupling the output and input of inverting amplifier 13 via the skin tissue, the variation in output voltage as a result of the charge step is directly proportional to the distance between plates 23, 24 and the skin surface, in turn dependent on the three-dimensional structure of the skin.

With appropriate amplification levels (e.g., 1000–2000), it is possible to detect differences in capacitance of about ten fF and hence micrometric distances. The output signals of the device according to the invention are therefore such, when converted into grey levels, as to provide a highly reliable representation of the three-dimensional structure of the skin surface.

The sensor device shown in FIGS. 1–3 has the following advantages. In particular, as stated, the sensor device provides for a high degree of precision with no need for complex processing of the output signal. Further, the sensor device may be produced easily and integrated using current microelectronic technology and is highly reliable, compact, and cheap to produce.

The sensor device according to the invention may also be used to advantage in other applications requiring precise detection of small distances.

Moreover, the simple design of each cell enables a large number of cells to be accommodated in array structures for detecting two-dimensional physical quantities.

Clearly, changes may be made to the device as described and illustrated herein without, however, departing from the scope of the present invention. In particular, if fabrication techniques enabling the formation of elastic structures (micromachining techniques) are available, the electrode whose distance is being measured may be connected directly to the input or output of inverting amplifier 13 to eliminate one of plates 23, 24. Moreover, all the components may be replaced by technical equivalents. For example, though an inverter such as inverting amplifier 13 is currently preferred for design and layout reasons, amplifier 13 may be implemented by any inverting or differential amplifier (e.g., an operational amplifier) in a charge amplifier configuration to increase the speed of the output signal.

What is claimed is:

1. A fingerprint sensor comprising:
   a semiconductor integrated circuit;
   a plurality of sensor cells formed as part of said integrated circuit;
   a plurality of capacitor plates within each of said sensor cells, said plurality including a first capacitor plate and a second capacitor plate;
   a surface for receiving a finger having a fingerprint pattern thereon; and
   an amplifier circuit within each sensor cell, the amplifier circuit having an input terminal connected to the first capacitor plate and an output terminal connected to the second capacitor plate;

a feedback loop from the output of the amplifier to the input of the amplifier on the semiconductor circuit, the feedback loop response being modified based on the presence of a fingerprint being adjacent the surface.

2. The apparatus according to claim 1, further including:
a charge transfer circuit for selectively providing an input charge to an input terminal of the amplifier.

3. The apparatus according to claim 1, further including a reset circuit for placing the output terminal of the amplifier in a selected state at a selected time.

4. The apparatus according to claim 1, further including:
a switch selectively coupling the input terminal to the output terminal in a short circuit connection.

5. The apparatus according to claim 1 wherein the input terminal of the amplifier is a negative input terminal.

6. The apparatus according to claim 1 wherein the amplifier is a single input invertor amplifier.

7. The apparatus according to claim 1 wherein said sensor cells are formed in an array that includes a large number of sensor cells on said semiconductor integrated circuit.

8. The apparatus according to claim 7, further including:
a buffer connected to the output of the sensor cells,
a horizontal scanning stage for enabling the reading of a cell in a selected row; and
a vertical scanning stage for enabling the reading of a cell in a selected column.

9. The apparatus according to claim 1, further including:
a voltage reference source coupled to the input terminal of the amplifier.

10. The apparatus according to claim 9 wherein the voltage reference source is coupled to the input terminal via an input capacitor, the input capacitor having one plate coupled to the reference voltage and the other plate coupled to the input of the amplifier.

11. The apparatus according to claim 10, further including:
a logic circuit having an output terminal of the logic circuit coupled to the sensor cell to provide the reference voltage to the amplifier circuit.

12. The apparatus according to claim 11, further including:
a voltage source in said logic circuit for changing the reference voltage from a first voltage level to a second voltage level at a selected time.

13. An apparatus comprising:
an integrated circuit;
an amplifier formed in said integrated circuit, said amplifier having an input terminal and an output terminal;
a first plate of a capacitor positioned adjacent a top surface of the integrated circuit and being electrically connected to the input terminal of the amplifier;
a second plate of the capacitor positioned adjacent the top surface of the integrated circuit and being electrically connected to the output terminal of the amplifier;
a dielectric layer positioned over the first and second plates of the capacitor; and
a switch for selectively directly connecting or disconnecting the output terminal and the input terminal of the amplifier to or from each other to perform a reset operation.

14. The apparatus according to claim 13, further including a charge source selectively coupled to the input terminal of the amplifier.

15. The apparatus according to claim 13, further including:
a logic circuit for selectively connecting the output of the amplifier to an output circuit to determine changes in the output voltage caused by an object adjacent to the top surface of the integrated circuit.

16. The apparatus according to claim 13, further including:
a plurality of amplifiers having respective first and second capacitor plates and respective switches all formed within said integrated circuit to provide an array of sensor cells.

17. The apparatus according to claim 16, further including:
a logic circuit to enable output from selected ones of said sensor cells to an output buffer.

18. An apparatus for sensing the change in capacitance of plates in a negative feedback loop comprising:
a sensor cell having a first capacitor plate and a second capacitor plate;
an amplifier having an input and an output within the sensor cell, said first capacitor plate being coupled to input and said second capacitor plate being coupled to the output;
a negative feedback loop from the output of the amplifier to the input of the amplifier, said negative feedback loop varying the voltage level at the
output terminal based on variations in the capacitive coupling between said first plate and said second plate when a voltage step change occurs on the input terminal.

19. The apparatus according to claim 18, further including:
switch means for placing the input terminal and the output terminal at the same voltage; and
means for causing said output terminal to reach a value based on the capacitive coupling between said first plate and said second plate as modified by an object placed adjacent to said plates.

20. The apparatus according to claim 18, further including;
a reset circuit means for placing the output of the amplifier at a known voltage prior to sensing.

21. The apparatus according to claim 20 wherein the reset circuit includes a switch for directly connecting the input of the amplifier to the output of the amplifier, both of which are thus coupled to the same selected voltage.

22. The apparatus according to claim 18, further including:
first reference voltage means for placing a first reference voltage on the input terminal of said amplifier at a first selected time; and
second reference voltage means for placing a second reference voltage on the input terminal of said amplifier at a second selected time.

23. The apparatus according to claim 22 wherein the first reference voltage means includes an input capacitor.

24. The apparatus according to claim 22 wherein the first reference voltage means includes a voltage source coupled to an input of the amplifier.

25. A method of sensing variations in capacitive coupling across an array of sensor cells comprising:
coupling an input of each respective sensor cell to a first selected reference voltage;
coupling an amplifier circuit within the sensor cell to the first selected reference voltage;
capacitively coupling the output of the amplifier to the input of the amplifier in a negative feedback capacitive loop;

placing an object adjacent a plurality of sensor cells in the array to change the capacitive coupling of the negative feedback from the output terminal to the input terminal for the amplifier;

inputting a charge to the sensor cell; and sensing the output voltage of a plurality of sensor cells in the array to determine a respective change in capacitive coupling in a plurality of cells caused by having said object adjacent the respective cell.

26. The method according to claim 25, further including:

resetting the sensor cells to have a selected output voltage on the amplifier output terminal prior to sensing the output voltage to determine the change in capacitive coupling.

27. The method according to claim 25, further including:

setting the outputs of each of said sensor cells to a first voltage level;

setting the inputs of each of said sensor cells to a second voltage level at a selected time prior to sensing the output voltage to determine the change in capacitive coupling.

28. The method according to claim 25, further including:

charging an input capacitor having a first plate connected to an input of the sensor cell to a selected voltage;

changing the voltage on a second plate of said input capacitor to a second voltage causing a rapid change in the voltage applied to the input of the sensor cell.

29. The method according to claim 25 wherein said sensor cells are positioned in an integrated circuit.

30. The method according to claim 25, further including:

scanning the array of sensor cells in a horizontal scan pattern; and scanning the array of sensor cells in a vertical scan pattern to selectively enable output from one sensor cell at a time.

31. The method according to claim 25 wherein the object causes the output voltage sensed from a first plurality of reference cells to be different from the output voltage sensed in a second plurality of reference cells.

* * * * *